United States Patent Office 3,666,496
Patented May 30, 1972

3,666,496
WATER SOLUBLE, POWDERED, TERPENE-
CONTAINING FLAVORS
Raymond Honey, Mount Kisco, N.Y., and James Frank
Perkins, Ramsey, N.J., assignors to Firmenich Incorporated, New York, N.Y.
No Drawing. Filed Sept. 3, 1969, Ser. No. 855,049
Int. Cl. A23l 1/26
U.S. Cl. 99—140 R                                        14 Claims

ABSTRACT OF THE DISCLOSURE

Terpene-containing flavor substances such as oils, essences, extracts, juices or concentrates, are dispersed in aqueous vehicles containing a dissolved normally solid carrier and a poly(oxyethylene)-poly(oxypropylene)-poly-(oxyethylene) block copolymer. Water is eliminated from the formulation to produce a powder in which the flavor ingredients are fixed in and upon the solid carrier. The resulting product retains the true flavor notes of the original flavor, is not subject to deterioration during storage, may be readily dissolved in water to form solutions of brilliant clarity and provides enhanced flavor qualities when incorporated in foods and beverages.

BACKGROUND OF THE INVENTION

In the production of spray dried or powdered flavor substances, the preservation of the true flavor notes and qualities of the original flavor in the powdered product is of paramount importance for achieving maximum appeal to the consumer and prevalence against competition. The presence of terpenes in the powdered flavor is virtually essential for meeting these objectives, since terpenes or terpene-like compounds are natural components of many popular flavors and contribute much of the true flavor notes, the natural freshness and the identifying characteristics of a specific flavor to the palate. Thus, retention of the natural terpene content in spray dried oils, essences, juices or concentrates obtained from natural sources, or of artificially added terpenes in the case of imitation flavors, is a desideratum of considerable value and importance.

One of the serious problems encountered in terpene-containing powdered flavors is marked and relatively rapid deterioration of the terpene components during storage. While oxidative degradation sometimes seems to be responsible, the mechanism by which the deterioration takes place appears also to involve some form of adverse interaction between the terpenes and other components which has not yet been explained or understood. From the flavorist's viewpoint, however, such deterioration is disastrous, since both the appearance and taste of the flavor upon rehydration in water are rendered unacceptable. More specifically, the rehydrated product will show a clear solution in which small pieces of insoluble matter (so-called "fisheyes") are unevenly distributed at the surface or bottom in an esthetically unappealing imbalance. The taste will be unappetizing due to foreign off-flavor notes and localized concentration, or so-called "hot spots" of flavor which upset and prevent uniform flavor balance throughout the product. Thus, the powdered flavor is no longer fit for product application.

Another problem of less serious consequences is that terpene-containing powdered flavors, even though not deteriorated in the way described above, upon rehydration will yield a cloudy, hazy or turbid appearance due to the fact that many of the terpenes are only partially, or not at all, soluble in water. Such an appearance is definitely a disadvantage when the flavor is added to a product intended to have a clear appearance, e.g., a clear beverage or a clear gelatin dessert.

Prior attempts to overcome these problems have been generally unsuccessful in regard to prevention of deterioration and only partially successful, at sacrifice of flavor quality, in regard to avoidance of turbidity. In particular, high concentrations of solvents and emulsifiers such as Tweens, high molecular weight alcohols and brominated vegetable oils have been incorporated in the aqueous flavor to be spray dried, hopefully to more completely dissolve or disperse the difficultly soluble components such as the terpenes and thereby retain more of them in the powdered product for truer flavor. However, such products are still prone to severe deterioration as previously described, and the use of large amounts of solvents or emulsifiers often introduces undesirable flavor notes in the product.

The art has also resorted to use of concentrated or so-called "folded" flavor oils to alleviate some of the foregoing problems, particularly the undesired cloudy or hazy appearance upon rehydration. While folded oils, due to being concentrated, can be used in relatively lesser amounts to reduce turbidity and gain more clarity, this is offset by the loss of true flavor notes, freshness and natural character of the flavor due to loss of volatile components during the concentration of the original oil. Such concentration usually is effected by distillation, which removes volatile components including the terpenes naturally present in the oil. Thus, the higher the concentration or fold value, the less acceptable are the flavor qualities.

SUMMARY OF THE INVENTION

The applicants have now discovered that the foregoing problems can be completely or substantially avoided by the production and use of powdered terpene-containing flavors which have been dehydrated from aqueous vehicles containing a dissolved solid carrier and a poly(oxyethylene)-poly(oxypropylene)-poly(oxyethylene) block copolymer have a structure as follows:

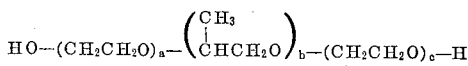

wherein the molecular weight of the polyoxypropylene moiety, is in the range from about 1750 to about 4000, the total percentage by weight of the polyoxyethylene moieties is in the range from about 40% to about 80% and the total molecular weight, calculated from the foregoing figures, is in the range from about 2900 to about 20,000. For some unknown reason, the above-defined copolymers are uniquely effective for preventing or overcoming the deterioration of terpenes in the powdered flavor that ordinarily results in off-flavor and fisheyes as previously described. Whether this is due to a direct action of the copolymer upon the terpenes or interference by the copolymer with the adverse interaction between the terpenes and other components that has been heretofore noted has not been determinable to date.

Neverthless, it has been clearly established that terpene-containing, powdered flavors produced in accordance with the invention capture the true flavor notes and qualities of a specific flavor in an unprecedented manner and that such properties are retained without deterioration over storage periods that data presently on hand indicate to be apparently indefinite. Moreover, powdered flavors produced in accordance with the invention are completely soluble in water, initially and after prolonged storage, and form transparent aqueous solutions having brilliant, sparkling clarity. Also, the powdered flavors of the invention can be prepared with unconcentrated, cold-pressed natural flavor oils without substantial loss of the natural terpene content thereof, whereby maximum freshness and natural character of the flavor is retained.

DESCRIPTION OF THE PREFERRED EMBODIMENTS

The invention may be practiced in connection with any of the terpene-containing flavors which are obtained from natural sources in the form of essential oils, essences, extracts, juices or concentrates, or with artificial flavors containing mixtures of such natural flavors and synthetic organic flavor compounds, or with wholly artifical flavors containing only the synthetic compounds.

The widest application of the invention is in connection with those flavors which are the most popular and used in very great quantities, such as citrus oils, e.g., orange, lemon, lime, grapefruit, curacao, tangerine; mints, e.g., pepermint, spearmint, and witch hazel; and spices, e.g., oils of allspice, basil, bay leaves, caraway, cardamon, cinnamon, clove, dill, ginger, lavender, lemon grass, marjoram, nutmeg, oregano, oil pepper, paprika, rosemary, saffron, sage, savory, tagete, thyme, and tumeric. Such flavors may be obtained from natural sources and transformed into stable water soluble powders by the process of the invention with maximum retention of the freshness and natural character of the original flavor.

In practicing the invention, it is necessary initially to combine the flavor with an aqueous vehicle which contains a dissolved normally solid carrier, as well as the poly(oxyethylene) - poly(oxypropylene) - poly(oxyethylene) copolymer previously described. Upon dehydration of the resulting formulation, the carrier ingredient solidifies and fixes the flavor ingredients upon itself, that is, the flavor ingredients are absorbed, encapsulated, or otherwise held by the carrier. The carrier may be any ingestible water-soluble normally solid carbohydrate substance, such as natural vegetable gums, e.g., gum arabic, gum acacia, gelatin; starch products, e.g., pregelatinized starch, starch hydrozylates, such as dextrins, and corn syrup solids, and starch derivatives such as starch phosphates; saccharides, e.g., sucrose, dextrose, maltose and fructose; and synthetic gums, such as carboxymethyl cellulose and sodium alginate. Other carrier substances customarily employed in foods and beverages, as is known to those skilled in the art, may be used in preparing the aqueous vehicle described above.

As previously noted, the flavor and carrier ingredients are combined in the aqueous vehicle with a poly(oxyethylene)-poly(oxypropylene)-poly(oxyethylene) block copolymer having a formula as follows:

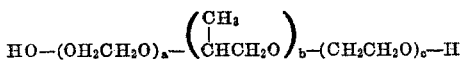

wherein the molecular weight of the polyoxypropylene moiety (the portion associated with subscript $b$) is in the range from about 1750 to about 4000, the total percentage by weight of the polyoxyethylene moieties (the portions associated with subscripts $a$ and $c$) is in the range from about 40% to about 80%, and the total molecular weight calculated from the foregoing figures is in the range from about 2900 to about 20,000.

These polymers are prepared by adding the required number of mols of propylene oxide to the two hydroxyl groups of propylene glycol to form a hydrophobic base and then adding ethylene oxide to both ends of the hydrophobic base to form hydrophilic polyoxyethylene groups of controlled length. Various speices of such polymers, including those defined above as useful in the invention, are available commercially from Wyandotte Chemicals Corporation of Wyandotte, Mich., under the trademark "Pluronic."

The use of the poly(oxyethylene)-poly(oxypropylene)-poly(oxyethylene) copolymers defined above in the initial aqueous formulation is essential to produce the stable water soluble powdered flavors possessing true flavor notes provided by the invention. This is manifested by the fact that subsequent addition of the copolymer to rehydrated conventionally spray dried flavors does not achieve the same beneficial results. It has also been demonstrated that these polymers are unique in their action when co-fixed with flavor ingredients upon the normally-solid carrier, since other types of polymeric surface active agents, such as the Tweens, high molecular weight aliphtic alcohols and brominated vegetable oils previously mentioned have not been effective. Excellent results have been achieved in particular with use of a specie of the polymers defined above wherein the molecular weight of the polyoxypropylene moiety is about 4000, the total percentage by weight of the polyoxyethylene moities is about 70%, and the total molecular weight calculated from the foregoing figures is about 13,330. This specific polymer is available commercially as Pluronic F-127 and its use in the invention is recommended for achieving the best results.

In forming the initial aqueous formulation of the flavor ingredients, the carrier ingredient and the poly(oxyethylene)-poly(oxypropylene)-poly(oxyethylene) copolymer, the carrier ingredient will constitute the largest quantity of the three materials. The proportion of the flavor ingredients, based upon the weight of the carrier, may be in the range from about 10% to about 40%. The proportion of the poly(oxyethylene)-poly(oxypropylene)-poly(oxyethylene) copolymer, based also upon the weight of the carrier, may be in the range from about 0.25% to about 250%.

The proportion of water that is combined with the foregoing three ingredients depends largely upon the technique that is used to dehyrate the aqueous formulation. For spray drying, which is preferred for use in the invention, the proportion of water based upon the total weight of the aqueous formulation may be from about 30% to about 50%. With other drying techniques which may also be used, such as slab fixation, freeze drying, plating, pan coating and coacervation, the proportion of water may be varied suitably in accordance with the requirements of these drying methods as will be known to those skilled in the art.

Where the drying technique inherently produces a powder, as in the case of spray drying, the resulting powdered flavor is ready immediately for addition to foods and beverages without further treatment. With other drying techniques which usually produce a friable slab, such as freeze drying or plating, the slab should be broken into a powder to produce the soluble flavor product of the invention.

The resulting powdered flavors are advantageously added to various foods, such as gelatin desserts, puddings, pie fillings, cake mixes, pancake mixes, casseroles and soups, and powders to be reconstituted into food beverages, such as tonics, milk products, fruit drinks and dietary supplements, especially those provided for weight control. In addition, the powdered flavors may be used in confections, such as hard candy, chocolate, gum drops, nougats and creams, and chewing gum. Also, the powdered flavors may be used to prepare liquid beverages, such as tonics, sodas, fruit beverages, milk beverages, and syrups. In these uses, the enhanced freshness and natural character of flavor, and the complete solubility and clarity afforded by the powdered flavors of the invention provide considerable improvements in the appearance and palatability of the flavored product.

The invention will be further described in connection with following specific embodiments thereof.

Example 1

An aqueous formulation was prepared based upon the following ingredients and proportions:

| | G. |
|---|---|
| Cold-pressed orange oil | 50 |
| Pluronic F-127 | 50 |
| Gum acacia | 500 |
| Water | 1100 |

The Pluronic F-127 polymer was first dissolved in the water and thereafter the gum acacia and orange oil were added in that order.

The formulation was pumped through an atomizer into a heated chamber maintained at 400 to 600° F. and thus spray dried to a powder.

The resulting powdered orange flavor was completely soluble in water and formed transparent aqueous solutions which remained stable over prolonged storage. The freshness and natural character of the reconstituted flavor exceeded that of conventional orange flavors which utilized five-fold and ten-fold orange oils and consequently lacked much of the natural terpene content retained in the powdered flavor produced in accordance with the invention.

Example 2

A powdered gelatin dessert formulation was prepared utilizing the powdered flavor of Example 1 in the following recipe:

| | G. |
|---|---|
| Sugar | 73.48 |
| Gelatin | 8.00 |
| Adipic acid | 2.50 |
| Sodium citrate | 0.70 |
| Color (FD&C Yellow No. 6) | 0.02 |
| Orange flavor, Example 1 | 0.30 |
| | 85.00 |

The foregoing recipe was dissolved in two cups of water to provide from four to six servings of orange gelatin dessert. The taste was exceptionally reminiscent of the freshness and natural character of fresh oranges.

Example 3

A powdered artificially-sweetened fruit drink formulation was prepared utilizing the powdered flavor of Example 1 in the following recipe:

| | G. |
|---|---|
| Critic acid | 3.75 |
| Sorbitol | 7.77 |
| Cyclamate-saccharin (12:1) | 1.88 |
| Color (FD&C Yellow No. 6) | 0.02 |
| Orange flavor, Example 1 | 1.00 |
| | 14.42 |

The foregoing recipe was dissolved in two cups of water to provide eight 8-ounce glasses of orange drink which had a fresh, natural taste as described in Example 2.

Example 4

In this example tests were made with an imitation orange flavor composed of natural and synthetic ingredients as follows:

| | Parts by weight |
|---|---|
| Orange oil, cold-pressed | 9,725 |
| Citral | 100 |
| $C_{10}$ aldehyde | 50 |
| $C_8$ aldehyde | 50 |
| $C_6$ | 25 |
| $C_{12}$ | 25 |
| $C_{10}$ alcohol | 25 |

The foregoing flavor was combined in aqueous formulations with varying proportions of Pluronic F-127 polymer and a carrier comprising a mixture of dried corn syrup solids, available commercially from Corn Products Company under the trade name Mor-Rex, and acid hydrolyzed starch, available commercially from National Starch & Chemical Co. under the trade name Nadex. The aqueous formulations were then spray dried to a powder and the powders were dissolved in water to determine the taste and appearance of the resulting aqueous flavors. As controls, the same imitation orange flavor was spray dried with only Mor-Rex and with only gum arabic. The results of these tests are set forth in the table below:

| Test number | Imitation orange, ounces | Mor-Rex/ Nadex, pounds | Gum arabic, pounds | Pluronic F-127, ounces | Appearance of aqueous flavor |
|---|---|---|---|---|---|
| 1 | 8 | | | 1 | Clear. |
| 2 | 8 | | 2.5 | | Cloudy. |
| 3 | 8 | 2.5 | | 8 | Clear. |
| 4 | 8 | 2.5 | | 4 | Do. |
| 5 | 8 | 2.5 | | 3 | Do. |
| 6 | 8 | 2.5 | | | Cloudy. |

As will be noted, the proportion between orange flavor and carrier was maintained constant in all of the tests and the proportions of Pluronic F-127 polymer were less than, equal to, and greater than the amount of orange flavor. All of the aqueous flavors prepared as solutions of the powdered flavors which included the Pluronic F-127 polymer exhibited a brilliant, sparkling clarity. This result was lacking in the two controls (Test No. 2 and Test No. 6) which gave solutions having a cloudy appearance.

Example 5

Tests similar to those described in Example 4 were made using a variety of flavor ingredients, gum arabic as the carrier, and Pluronic F-127 polymer. The results of these tests are given in the following table:

| Flavor ingredients | Pluronic F-127, ounces | Gum arabic, ounces | Appearance of aqueous flavor |
|---|---|---|---|
| Orange terpenes, 4 ounces | 4 | 20 | Clear. |
| Cinnamon oil, 4 ounces | 4 | 20 | Do. |
| Peppermint oil, 4 ounces | 4 | 20 | Do. |

Example 6

4 oz. of a poly(oxyethylene)-poly(oxypropylene)-poly(oxyethylene) block copolymer were dissolved in water, the molecular weight of the polyoxypropylene moiety in the copolymer being about 1750, the total percentage by weight of the polyoxyethylene moieties being about 80% and total molecular weight of the copolymer calculated from the foregoing figures being about 8750. This polymer is available commercially from the Wyandotte Chemical Corporation under the trade name Pluronic F-68.

To the foregoing solution were added 20 oz. of gum arabic and 4 oz. of cold-pressed orange oil. The resulting aqueous formulation was spray dried to a powder which was completely soluble in water. The aqueous solutions of the powder were transparent and exceptionally reminiscent of fresh, natural orange flavor.

Example 7

An aqueous formulation was prepared of the following ingredients:

| | | |
|---|---|---|
| Orange oil, five-fold | oz | 8 |
| Pluronic F-127 | oz | 8 |
| Gum arabic | lbs | 2½ |
| Water | lbs | 8 |

The Pluronic F-127 copolymer was first dissolved in water followed by addition of the gum arabic and orange oil. The resulting formulation was spray dried to a powder which was completely water soluble. Aqueous solutions of the powder were crystal clear and had a flavor equal in quality to a standard five-fold orange oil.

Any departure from the foregoing description which conforms to the present invention is intended to be included within the scope of the appended claims.

The following is claimed:

1. A powdered flavor comprising a normally solid ingestible carrier material in particulate form, said carrier particles bearing at least one terpene-containing flavor substance and a poly(oxyethylene)-poly(oxypropylene)-poly(oxethylene) copolymer having the formula:

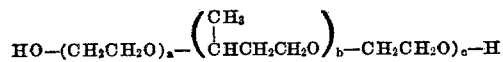

wherein the molecular weight of the polyoxypropylene moiety is in the range from about 1750 to about 4000, the total percentage by weight of the polyoxyethylene moieties is in the range from about 40% to about 80% and the total molecular weight of the copolymer calculated from the foregoing figures is in the range from about 2900 to about 20,000.

2. A powdered flavor according to claim 1 wherein the amount of said flavor substance is from about 10% to about 40% based upon the weight of said carrier particles and the amount of said copolymer is from about 0.25% to about 250% based upon the weight of said carrier particles.

3. A powdered flavor according to claim 1 wherein said carrier particles comprise a natural or synthetic gum.

4. A powdered flavor according to claim 1 wherein said carrier particles comprise starch or a derivative of starch.

5. A powdered flavor according to claim 1 wherein said carrier particles comprise a saccharide.

6. A powdered flavor according to claim 1 wherein said flavor substance comprises a citrus oil.

7. A powdered flavor according to claim 1 wherein said copolymer comprises a molecular weight of the polyoxypropylene moiety of about 4000, a total percentage by weight of the polyoxyethylene moieties of about 70% and a total calculated molecular weight of about 13,330.

8. A powdered flavor according to claim 1 wherein said copolymer comprises a molecular weight of the polyoxypropylene moiety of about 1750, a total percentage by weight of the polyoxyethylene moieties of about 80% and a total calculated molecular weight of about 8750.

9. A powdered flavor according to claim 1 which is completely soluble in water.

10. In a flavored food or beverage, the improvement comprising a flavor-enhancing amount of an added powdered flavor comprising a normally solid ingestible carrier material in particulate form, said carrier particles bearing at least one terpene-containing flavor substance and a poly(oxyethylene)-poly(oxypropylene)-poly(oxyethylene) copolymer having the formula:

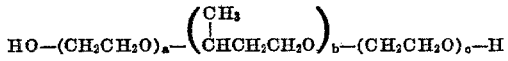

wherein the molecular weight of the polyoxypropylene moiety is in the range from about 1750 to about 4000, the total percentage by weight of the polyoxyethylene moieties is in the range from about 40% to about 80% and the total molecular weight of the copolymer calculated from the foregoing figures is in the range from about 2900 to about 20,000.

11. A method of producing a powdered flavor which comprises forming a mixture of water, a normally solid ingestible carrier material, at least one terpene-containing flavor substance and a poly(oxyethylene)-poly(oxypropylene)-poly(oxyethylene) copolymer having the formula:

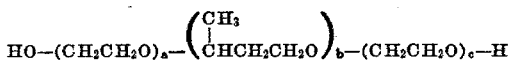

wherein the molecular weight of the polyoxypropylene moiety is in the range from about 1750 to about 4000, the total percentage by weight of the polyoxyethylene moieties is in the range from about 40% to about 80% and the total molecular weight of the copolymer calculated from the foregoing figures is in the range from about 2900 to about 20,000, and then drying said mixture to a solid residue.

12. A method according to claim 11 wherein the amount of said flavor substance is from about 10% to about 40% based upon the weight of said carrier material, the amount of said copolymer is from about 0.25% to about 250% based upon the weight of said carrier material, and the amount of water is sufficient at least to dissolve said carrier material.

13. A method according to claim 11 wherein said drying is effected by atomizing said mixture and injecting said atomized mixture into a drying zone maintained at a temperature within the range from about 400° to about 600° F.

14. A method according to claim 11 which includes the steps of drying said mixture to a friable solid slab and then breaking said slab into separate particles.

References Cited
UNITED STATES PATENTS

| | | | |
|---|---|---|---|
| 2,809,895 | 10/1957 | Swisher | 99—140 |
| 3,365,298 | 1/1968 | Bouthilet | 99—140 UX |
| 2,754,215 | 7/1956 | Evans | 99—140 |
| 3,294,550 | 12/1966 | Ikeda | 99—140 |

OTHER REFERENCES

Chemical Abstracts, 68: 11748e (1968).

MORRIS O. WOLK, Primary Examiner

S. MARANTZ, Assistant Examiner

U.S. Cl. X.R.

99—28, 78, 105, 130

PO-1050
(5/69)

UNITED STATES PATENT OFFICE
CERTIFICATE OF CORRECTION

Patent No. 3,666,496          Dated May 30, 1972

Inventor(s) Raymond Honey and James Frank Perkins

It is certified that error appears in the above-identified patent and that said Letters Patent are hereby corrected as shown below:

Column 3, line 49 "$(OH_2CH_2O)$" should read --$(CH_2CH_2O)$--.

Column 5, line 62 "$C_{12}$" should read --$C_{12}$ alcohol--.

Column 5, line 61 "$C_6$" should read --$C_6$ aldehyde--.

Signed and sealed this 21st day of November 1972.

(SEAL)
Attest:

EDWARD M. FLETCHER, JR.          ROBERT GOTTSCHALK
Attesting Officer          Commissioner of Patents